(12) United States Patent
Schaeffer et al.

(10) Patent No.: US 9,022,789 B2
(45) Date of Patent: May 5, 2015

(54) SIALENDOSCOPY DEMONSTRATION APPARATUS

(75) Inventors: Darin Schaeffer, Bloomington, IN (US); Daniel Weddle, Bloomington, IN (US)

(73) Assignee: Cook Medical Technologies LLC, Bloomington, IN (US)

( * ) Notice: Subject to any disclaimer, the term of this patent is extended or adjusted under 35 U.S.C. 154(b) by 72 days.

(21) Appl. No.: 13/606,730

(22) Filed: Sep. 7, 2012

(65) Prior Publication Data

US 2013/0236873 A1   Sep. 12, 2013

Related U.S. Application Data

(60) Provisional application No. 61/532,854, filed on Sep. 9, 2011.

(51) Int. Cl.
 *G09B 23/28*    (2006.01)
 *G09B 23/34*    (2006.01)
 *G09B 23/30*    (2006.01)

(52) U.S. Cl.
 CPC ............... *G09B 23/34* (2013.01); *G09B 23/30* (2013.01)

(58) Field of Classification Search
 CPC ...... G09B 23/283; G09B 23/28; G09B 23/30; G09B 23/281; G09B 23/285; G09B 23/286; G09B 23/288
 USPC .................................................. 434/262–275
 See application file for complete search history.

(56) References Cited

U.S. PATENT DOCUMENTS

| | | |
|---|---|---|
| 5,055,051 A | 10/1991 | Duncan |
| 6,336,812 B1 | 1/2002 | Cooper et al. |
| 6,857,878 B1 | 2/2005 | Chosack et al. |
| 6,863,536 B1 | 3/2005 | Fisher et al. |
| 6,929,481 B1 | 8/2005 | Alexander et al. |
| 6,939,138 B2 | 9/2005 | Chosack et al. |

(Continued)

FOREIGN PATENT DOCUMENTS

| | | |
|---|---|---|
| EP | 2112645 | 10/2009 |
| WO | 2010071533 | 6/2010 |
| WO | 2010119266 | 10/2010 |

OTHER PUBLICATIONS

International Searching Authority, The International Search Report and The Written Opinion of the International Searching Authority for the International Application No. PCT/US2012/054186, mailed Feb. 20, 2013, p. 1-9.

(Continued)

*Primary Examiner* — Timothy A Musselman
(74) *Attorney, Agent, or Firm* — Buchanan Nipper

(57) ABSTRACT

Models, kits and methods useful in the demonstration of sialendoscopy devices and techniques are described. An exemplary demonstration apparatus comprises a support structure, an insert structure contacting the support structure, and a duct structure contacting the insert structure. The insert structure has a top surface defining a first opening and a bottom surface defining a second opening, and defines a channel with a first end in communication with the first opening and a second end in communication with the second opening. The duct structure comprises an elongate tubular member and has a first end in fluid communication with the first opening of the insert member, a second end, and defines a lumen extending from the first end to the second end. A portion of the duct structure is releasably disposed within the channel defined by the insert structure.

20 Claims, 11 Drawing Sheets

(56) References Cited

U.S. PATENT DOCUMENTS

| | | |
|---|---|---|
| 6,988,894 B2 | 1/2006 | Lee et al. |
| 7,261,565 B2 | 8/2007 | Chosack et al. |
| 7,648,367 B1 | 1/2010 | Makower et al. |
| 7,806,696 B2 | 10/2010 | Alexander et al. |
| 7,833,018 B2 | 11/2010 | Alexander et al. |
| 7,931,470 B2 | 4/2011 | Alexander et al. |
| 8,465,291 B2 * | 6/2013 | Bell ............................ 434/263 |
| 2004/0191739 A1 | 9/2004 | Lee et al. |
| 2005/0008997 A1 | 1/2005 | Herman |
| 2005/0214727 A1 | 9/2005 | Stoianovici et al. |
| 2009/0075244 A1 * | 3/2009 | Sakezles ....................... 434/267 |
| 2014/0051050 A1 * | 2/2014 | Fradette et al. ............... 434/267 |

OTHER PUBLICATIONS

International Bureau of WIPO. International Preliminary Report on Patentability and Written Opinion, for International Application No. PCT/US2012/054186, Mar. 20, 2014. p. 1-6.

* cited by examiner

SIALENDOSCOPY DEMONSTRATION APPARATUS

CROSS-REFERENCE TO RELATED APPLICATION

This application claims priority to U.S. Provisional Application No. 61/532,854, filed on Sep. 9, 2011. The entire contents of this related application are hereby incorporated into this disclosure.

FIELD

The disclosure relates generally to the field of medical equipment. More particularly, the disclosure relates to models useful in the demonstration of sialendoscopy devices. The disclosure also relates to kits and methods related to the models.

BACKGROUND

The treatment of various medical conditions related to the salivary ducts can involve several techniques, including wire insertion, dilation of the papilla and duct, sheath insertion, irrigation, visualization, balloon dilatation of strictures, lithotripsy, and stone removal. In the salivary duct, each of these procedures is complicated by the size of the duct itself, which is relatively small in comparison to other body vessels within which minimally invasive procedures have become common, such as the vessels of the vasculature system.

Unfortunately, the art lacks a model that simulates the various salivary duct structures—including normal and non-normal structures—that can be encountered during medical treatment of various conditions related to the salivary ducts. As a result, medical practitioners do not have an effective tool that allows visualization and use of specialized medical devices intended for use in salivary duct treatment procedures.

Thus, a need exists for a demonstration apparatus that can be used to demonstrate sialendoscopy medical devices and methods for training and other purposes.

BRIEF SUMMARY OF DESCRIBED EMBODIMENTS

Various exemplary demonstration apparatuses are described and illustrated herein.

An exemplary demonstration apparatus comprises a support structure, an insert structure contacting the support structure, and a duct structure contacting the insert structure. The insert structure has a top surface defining a first opening and a bottom surface defining a second opening, and defines a channel with a first end in communication with the first opening and a second end in communication with the second opening. The duct structure comprises an elongate tubular member and has a first end in fluid communication with the first opening of the insert member, a second end, and defines a lumen extending from the first end to the second end. A portion of the duct structure is releasably disposed within the channel defined by the insert structure.

Various alternative duct structures can be included with the demonstration apparatus, including a duct structure that represents the anatomy of a normal salivary duct, a duct structure that represents the anatomy of a non-normal salivary duct that includes an enlarged portion along its length, a duct structure that represents the anatomy of a non-normal salivary duct that includes a reduced diameter portion along its length, and a duct structure that represents the anatomy of a non-normal salivary duct that includes an enlarged portion along its length and a reduced diameter portion along its length. Simulated stones can be included in the duct structures, such as in the interior chambers defined by the enlarged portions of appropriate duct structures. To simulate bifurcations present in some body vessels, such as human salivary ducts, the duct structures may also contain one or more branches that define branches in a main lumen.

The support structure can comprise a replica of a human lower jaw. Furthermore, the insert structure can comprise a relatively soft material, as compared to the material of the support structure, to mimic the difference in relative hardnesses of the human lower jaw and the soft tissue of the oral cavity. In some embodiments, the insert structure includes a movable member that mimics the structure and configuration of the human tongue.

Various demonstration kits are also described and illustrated herein.

An exemplary demonstration kit comprises a support structure; an insert structure; and one each of a duct structure that represents a normal salivary duct, as described above; a duct structure that represents a non-normal salivary duct and includes an enlarged portion defining an interior chamber and including a simulated stone, as described above; a duct structure that represents a non-normal salivary duct and includes a reduced diameter portion that defines a stricture, as described above; and a duct structure that represents a non-normal salivary duct and includes an enlarged portion defining an interior chamber and including a simulated stone and a reduced diameter portion that defines a stricture.

Other exemplary kits comprise a support structure; an insert structure; and a single duct structure that represents a normal salivary duct, a non-normal salivary duct with an enlarged portion containing a simulated stone, a non-normal salivary duct with a stricture, or a non-normal salivary duct with a stricture and an enlarged portion including a simulated stone.

Other exemplary kits comprise a support structure; an insert structure; and two or more duct structures, each of which represents a normal salivary duct, a non-normal salivary duct with an enlarged portion containing a simulated stone, a non-normal salivary duct with a stricture, or a non-normal salivary duct with a stricture and an enlarged portion including a simulated stone.

Additional understanding of these exemplary apparatuses, kits, and methods can be obtained with review of the detailed description, below, and the appended drawings.

DETAILED DESCRIPTION OF ILLUSTRATED EMBODIMENTS

The following detailed description and the appended drawings describe and illustrate various exemplary demonstration apparatuses, kits and methods. The description and drawings are exemplary in nature and are provided to enable one skilled in the art to make and use one or more exemplary apparatus, kit and/or to practice one or more exemplary method. They are not intended to limit the scope of the claims in any manner.

As used herein, the term "demonstration" refers to the performance of a procedure in a simulated environment or the ability of an apparatus to be used in such a performance. The term does not require the presence of an audience or that the performance have any particular purpose (e.g., training, etc.).

Figure 1:
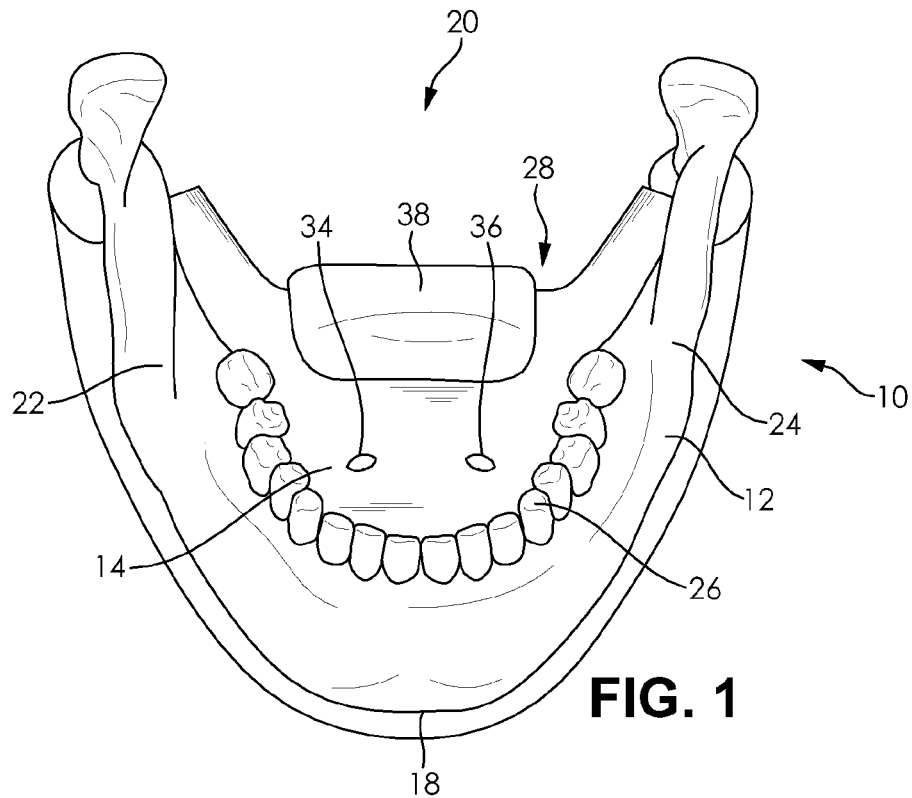
FIG. 1 is a top view of a first exemplary demonstration apparatus.
Figure 2:
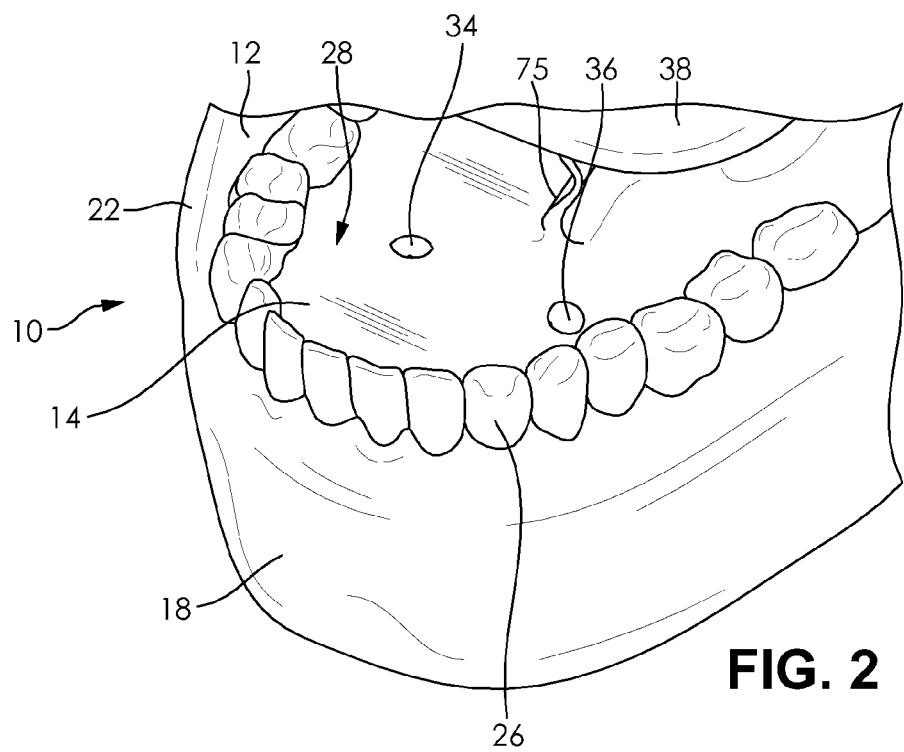
FIG. 2 is an enlarged perspective view of the demonstration apparatus illustrated in FIG. 1.
Figure 3:
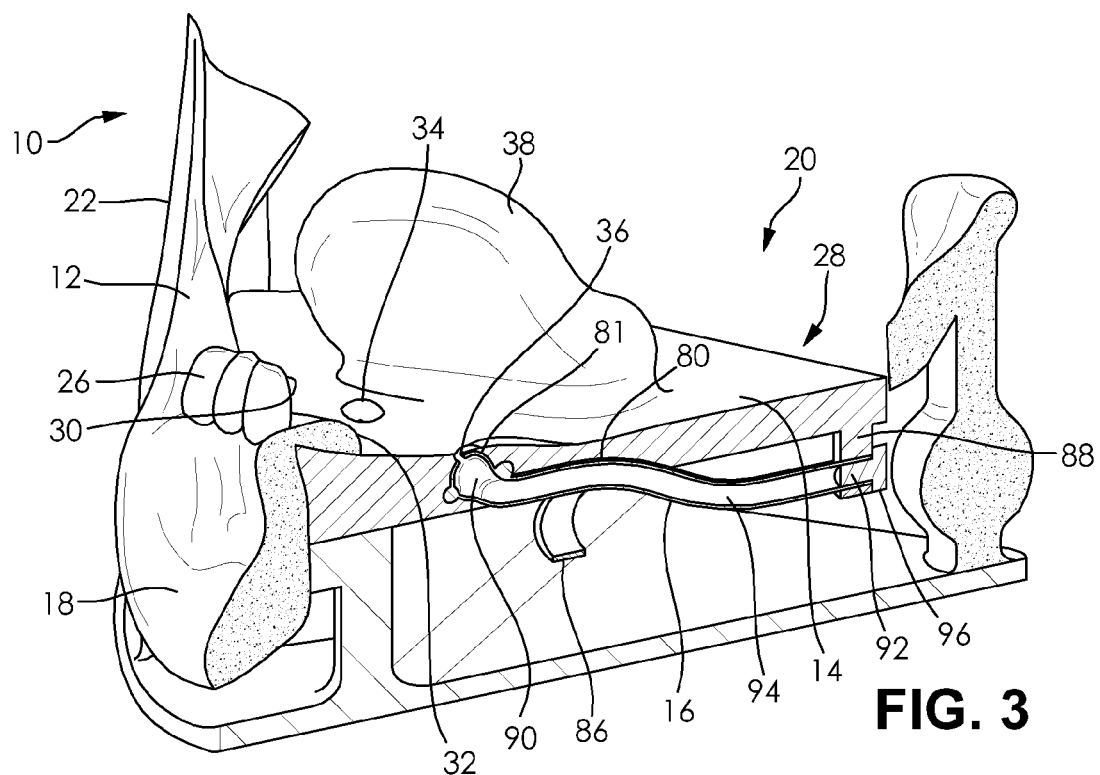
FIG. 3 is a sectional view of the demonstration apparatus illustrated in FIG. 1.
Figure 4:
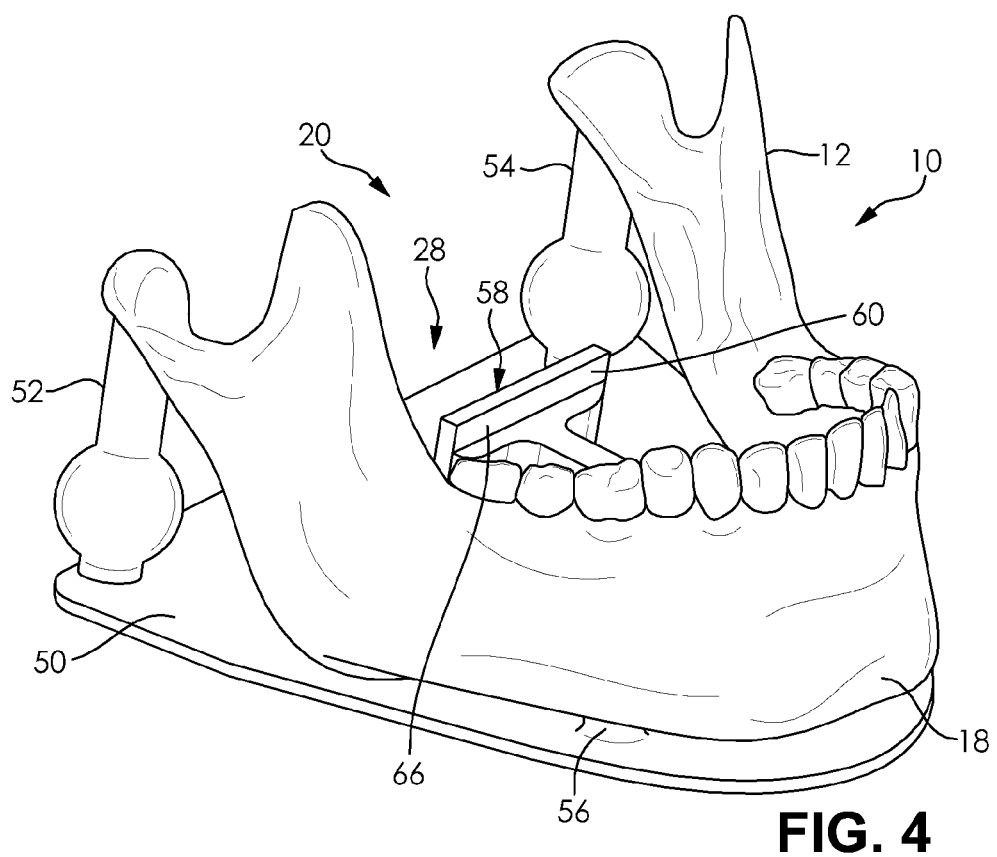
FIG. 4 is a perspective view of the support structure of the demonstration apparatus illustrated in FIG. 1.
Figure 5:
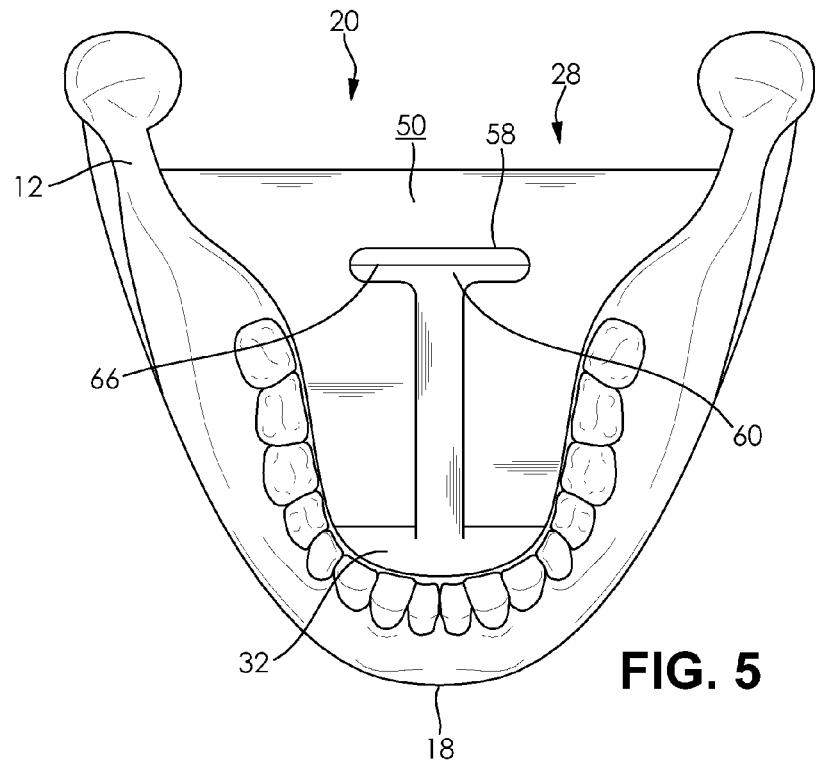
FIG. 5 is a top view of the support structure illustrated in FIG. 4.
Figure 6:
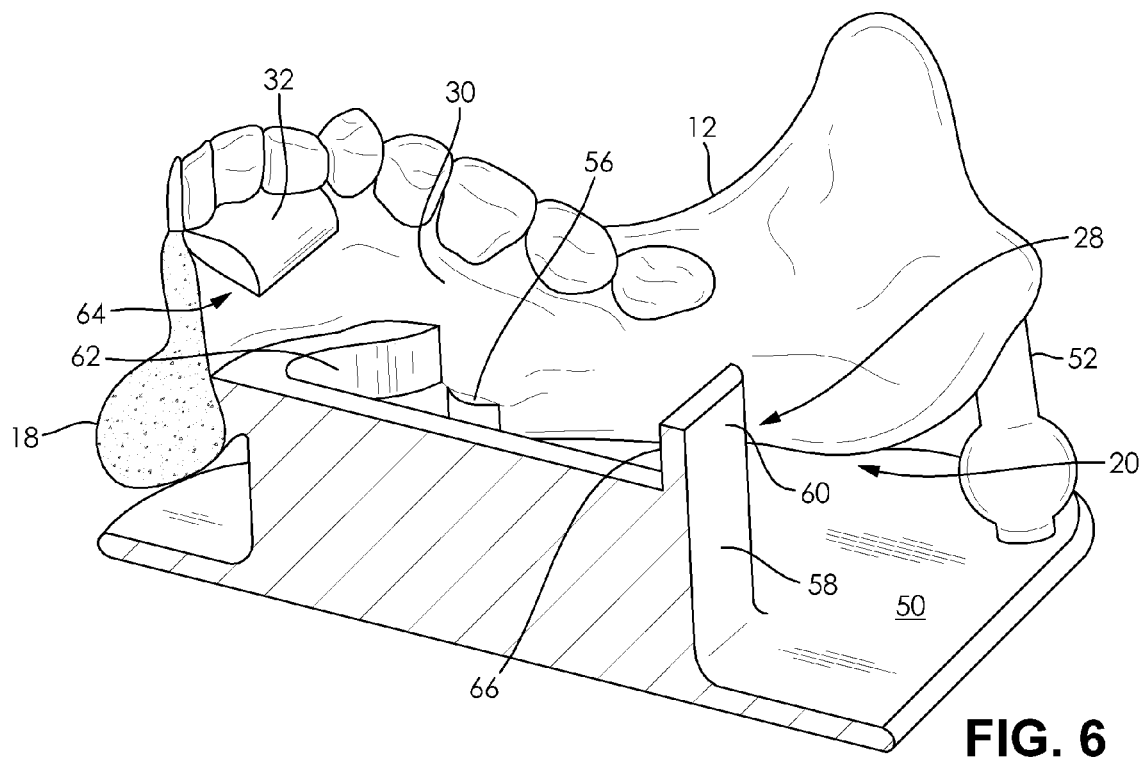
FIG. 6 is a sectional view of the support structure illustrated in FIG. 4.
Figure 7:
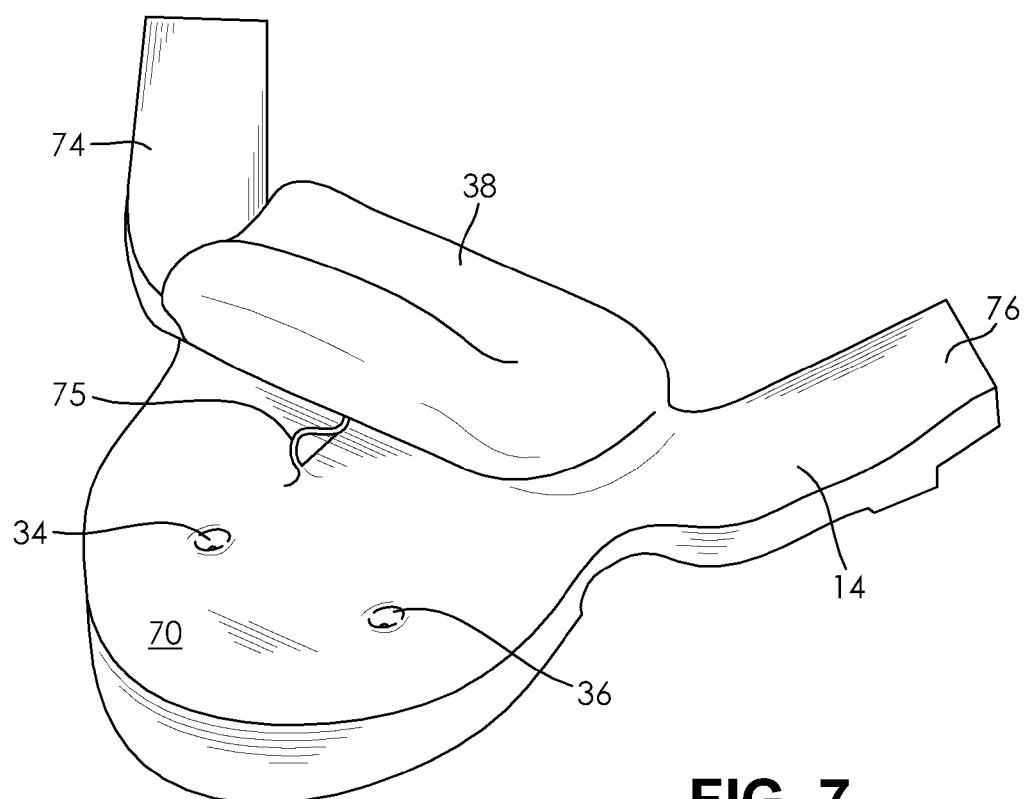
FIG. 7 is a perspective view of the insert structure of the demonstration apparatus illustrated in FIG. 1.
Figure 8:
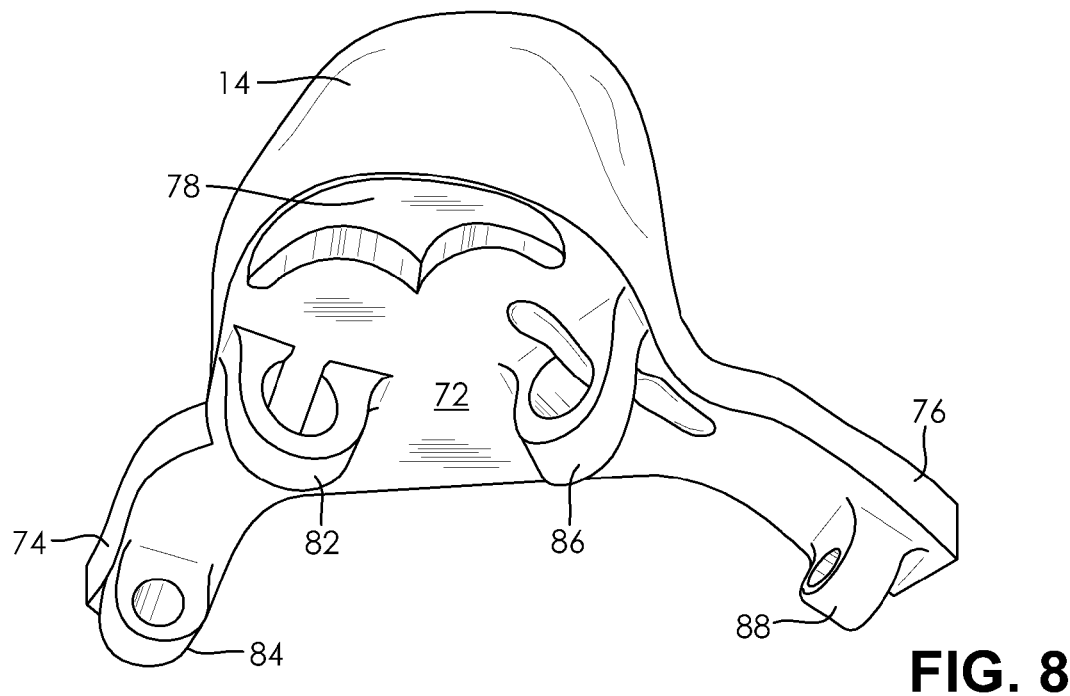
FIG. 8 is a bottom view of the insert structure illustrated in FIG. 7.
Figure 9:
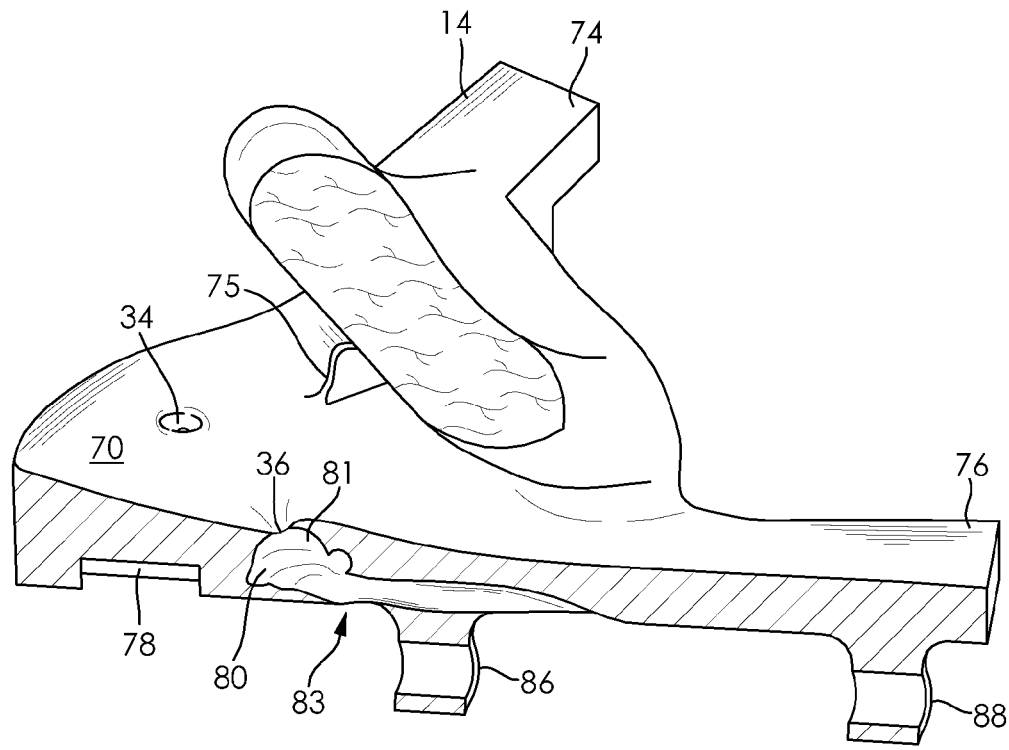
FIG. 9 is a sectional view of the insert structure illustrated in FIG. 7.
Figure 10:
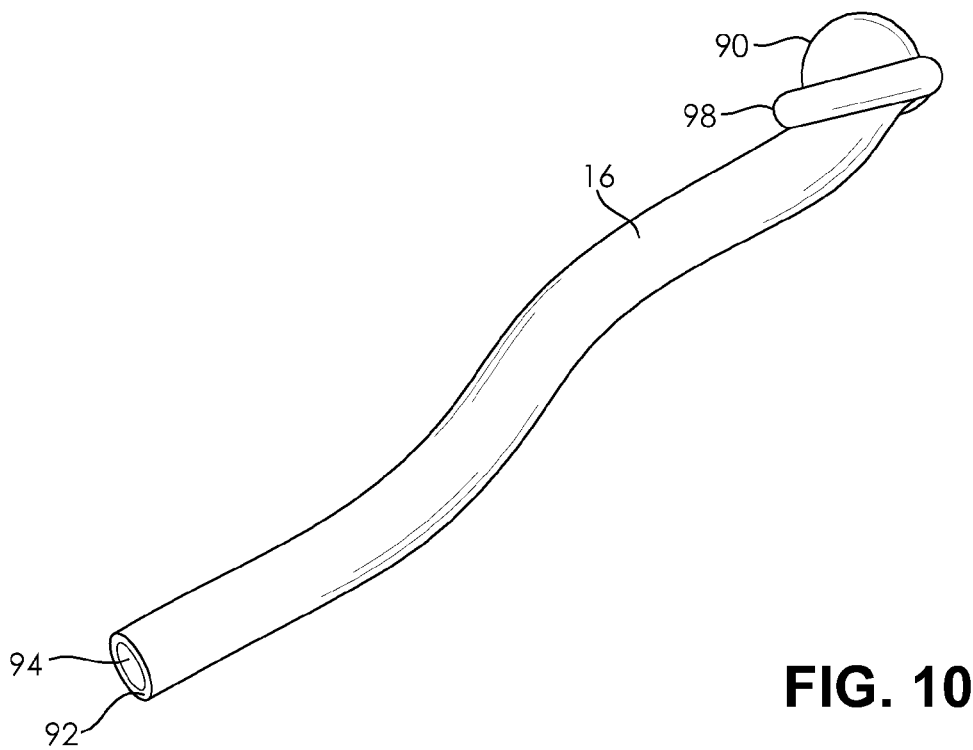
FIG. 10 is a perspective view of the duct structure of the demonstration apparatus illustrated in FIG. 1.
Figure 11:
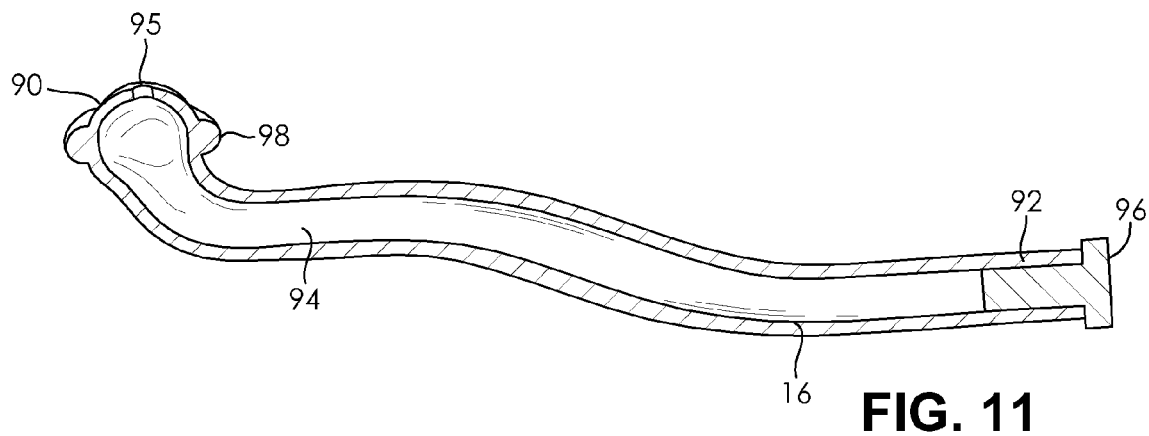
FIG. 11 is a sectional view of the duct structure illustrated in FIG. 10.

FIGS. 1, 2 and 3 illustrate a first exemplary demonstration apparatus 10. The demonstration apparatus 10 includes a support structure 12, an insert structure 14 contacting the support structure 12, and a duct structure 16 contacting the insert structure 14. FIGS. 4 through 6 illustrate the support structure 12 independent of the other components of the demonstration apparatus 10. FIGS. 7 through 9 illustrate the insert structure 14 independent of the other components of the demonstration apparatus 10. FIGS. 10 and 11 illustrate the duct structure 16 independent of the other components of the demonstration apparatus 10.

While not illustrated in the figures, the support structure can include additional structural elements and/or features. For example, in some embodiments, it may be advantageous to include an upper jaw in the support structure. In these embodiments, the upper jaw can be attached to another portion of the support structure in a manner that allows the upper jaw to pivot with respect to another portion of the support structure. For example, an upper jaw member can be attached to a lower jaw member, such as the lower jaw structures described and illustrated herein, in a manner that allows the upper jaw to pivot relative to the lower jaw along a natural range of motion for a jaw being simulated by the demonstration apparatus, such as a human jaw. Also, the upper jaw can be releasably attached to the lower jaw member to facilitate removal of an insert structure and/or duct structures.

Any suitable support structure can be utilized in a demonstration apparatus according to a particular embodiment, and the support structure can have any suitable size, shape, and configuration. To more accurately simulate demonstrations of sialendoscopy methods and/or devices, the inventors consider it advantageous to include a support structure that is a substantial replica of the lower jaw of an animal, such as a human.

The support structure 12 illustrated in FIGS. 1 through 3 is a replica of a human lower jaw. The support structure 12 has a proximal end 18, a distal end 20, a first lateral side 22, and a second lateral side 24. The proximal end 18 is a closed arc extending between the first 22 and second 24 lateral sides, while the distal end 20 is open. This arrangement mimics the human lower jaw, but also has additional advantages. For example, as described below, the closed proximal end 18 can include structure adapted to releasably retain the insert structure 14. Also, the open distal end 20 facilitates access for manipulation of the insert structure 14 and the duct structure 16, as described in greater detail below. Additional components that represent body portions commonly associated with a human lower jar, such as teeth 26, can be included as separately attached or integrally formed components.

The support structure 12 defines a chamber 28 bounded by the proximal end 18 and the first 22 and second 24 lateral sides. The chamber 28 is adapted to receive the insert structure 14. As best illustrated in FIG. 3, an inner surface 30 of the support structure 12 can define a ridge 32 that is adapted to releasably retain the insert structure 14 in the chamber 28. The ridge 32 can extend along a portion of the inner surface 30, such as a portion of the proximal end 18. In this embodiment, the ridge 32 is an inwardly-directed notch under which a portion of the insert structure 14 can be positioned. Alternatively, the ridge 32 can extend along the entire inner surface 30 of the support structure 12. Thus, the ridge 32 can extend along the inner surface of the proximal end, the first lateral side 22 and the second lateral side 24. In this embodiment, the ridge is an inwardly-directed rail structure under which the peripheral edge of the insert structure 14 can be positioned. No matter the structure of the ridge 32, an appropriate portion of the insert structure 14 can be positioned under the ridge 32 to retain the insert structure 14 in the chamber 28. To remove the insert structure 14 from the chamber, a user simply forces the portion of the insert structure 14 from under the ridge 32 to release the insert structure from its hold.

As best illustrated in FIGS. 4 through 6, the support structure 12 includes a substantially flat stage 50 and a series of stanchions 52, 54, 56 that support the jaw-like portions of the support structure 12 in an arrangement relative to the stage 50 that mimics the typical arrangement of a lower jaw bone of an upright animal. The inclusion of a stage 50 and one or more stanchions 52, 54, 56 in this arrangement is considered advantageous at least because it facilitates use of the demonstration apparatus 10 on a table or benchtop and provides support for the apparatus 10 during such use.

As best illustrated in FIG. 6, the support structure 12 can also include an elongate upright bridge 58 that extends upward from the stage 50 from an area near the proximal end 18 of the support structure 12 toward the distal end 20 of the support structure 12. The bridge 58 provides a structure for supporting the insert structure 14 within the chamber 28. The bridge 58 advantageously has an anchor shape, extending from a cross member 60 disposed in the chamber 28 to a base 62 at the proximal end 18 of the support structure 12. The base advantageously extends outward from the inner surface of the proximal end 18 of the support structure 12 to define a channel 64 between the base 62 and the ridge 32. The channel 64 is sized and configured to releasably receive a portion of the insert structure 14. Also, as best illustrated in FIGS. 4 and 5, the cross member 60 can define a shoulder 66 adapted to receive and support a portion of the insert structure 14.

Any suitable insert structure can be utilized in a demonstration apparatus according to a particular embodiment, and the insert structure can have any suitable size, shape, and configuration. To more accurately simulate demonstrations of sialendoscopy methods and/or devices, the inventors consider it advantageous to include an insert structure that is formed of a material that is softer than the material used to form the support structure. Such an insert structure replicates the difference in relative hardness between the bone of the lower jaw and the soft tissue of the mouth or oral cavity floor, providing a more realistic demonstration tool.

The insert structure 14 defines first 34 and second 36 openings that extend through a thickness of the insert structure 14. As best illustrated in FIG. 1, the openings 34, 36 are advantageously positioning toward the proximal end 18 of the support structure 12 and spaced equidistantly from a longitudinal axis of the insert structure 14. This arrangement is intended to mimic the arrangement of the openings of the salivary ducts in animals, such as in humans.

The openings 34, 36 can have any suitable configuration. Furthermore, the openings 34, 36 can have identical or different configurations. For example, as best illustrated in FIG. 2, each of the openings can comprise a hemispherical void in the top surface of the insert structure 14 with a channel of constant diameter that extends from the base of the void through a thickness of the insert structure 14. Alternatively, one or both of the openings 34, 36 can comprise a channel of constant diameter that extends through a thickness of the insert structure 14.

The insert structure 14 can also include a movable portion 38 attached to or integrally formed with the top surface of the insert structure 14. The movable portion 38 can have any suitable size and/or configuration. To more accurately simulate demonstrations of sialendoscopy methods and/or devices, the inventors consider it advantageous to include a movable portion with a size and configuration that is a substantial replica of a human tongue. Inclusion of such a movable portion 38 allows for the demonstration of manipulations of the tongue considered necessary and/or optional to a particular method for which the demonstration apparatus is being used. For example, it may be necessary to manipulate the tongue to access the first 34 and second openings 36 during a demonstration of a sialendoscopy method.

As best illustrated in FIGS. 7 through 9, the insert structure 14 comprises a top surface 70 and a bottom surface 72, and includes first 74 and second 76 arms that extend laterally and distally from the portion of the insert structure 14 that defines the openings 34, 36. A flexible attachment member 75 can be included that joins the movable portion 38 to the top surface 70.

As best illustrated in FIG. 8, the bottom surface 72 of the insert structure 14 defines a recess 78. While considered optional, the inclusion of a recess 78 in the bottom surface is considered advantageous at least because it confers additional flexibility onto the insert structure 14, beyond that which is achieved solely by the material selected for the insert structure 14. The recess 78 can have any suitable size and configuration, and a skilled artisan will be able to select an appropriate size and configuration for a particular embodiment based on various considerations, including a desired degree of flexibility for the insert structure 14. No matter its structure, it is considered advantageous to configure the recess 78 with a size and configuration that requires a force fit of mild pressure to secure the thickness of the front edge of the insert structure 14 into the channel 64 defined by the support structure 12. Such a configuration will facilitate releasable securement of the insert structure 14 within the chamber 28 of the support structure 12 while not making its removal overly difficult.

As best illustrated in FIGS. 1 and 9, the insert structure 14 defines a channel 80 adapted to releasably receive a portion of a duct structure 16 (not illustrated in FIG. 9). As best illustrated in FIG. 9, the channel 80 extends from a first or proximal end 81 that is in fluid communication with opening 36 to a second or distal end 83 that opens to the bottom surface 72 of the insert structure 14. To more accurately simulate demonstrations of sialendoscopy methods and/or devices, the inventors consider it advantageous to include a second channel similar to the first channel 80. If included, the second channel (not illustrated in the figures) is advantageously positioned and configured in the same manner as the first channel. Thus, an included second channel extends from a first or proximal end that is in fluid communication with opening 34 to a second or distal end that opens to the bottom surface 72 of the insert structure 14.

As best illustrated in FIG. 8, the insert structure advantageously defines a series of retaining members 82, 84, 86, 88 extending from the bottom surface 72 and adapted to releasably receive a portion of a duct structure (not illustrated in FIG. 8). Any suitable structure can be used for the retaining members. Examples of suitable structures include ring members, as illustrated in the figures, stanchion pairs or other structure pairs, clips and other structure suitable for releasably receiving a tubular structure. As an alternative to the inclusion of retaining members, the duct structure(s) can be disposed between layers defined by the insert structure 14, in a sandwiched or layered arrangement, to achieve a desired positioning and securement of the duct structure(s).

The duct structure 16 is an elongate tubular member having a first end 90 and a second end 92. The first end 90 is in fluid communication with one of the openings 34, 36 defined by the insert structure 14. The second end 92 can be closed or, as illustrated in the figures, open. The duct structure 16 defines a lumen 94 extending from the first end 90 to the second end 92. If the second end 92 is closed, the lumen 94 is in essence a blind passage. If the second end 92 is open, the lumen 94 defines a passageway that allows fluid flow through the entire length of the duct structure 16. In these embodiments, a plug 96 can be inserted into the second end 92 to block such fluid flow and to temporarily create a blind passage. When fluid flow through the lumen is desired, the plug 96 can be removed. A plug can be included for additional or alternative purpose, such as to further simulate the anatomy of a particular duct. For example, as best illustrated in FIG. 11, a plug 96 that includes a small opening on its inward-facing surface, relative to the lumen 94 of the duct structure 16, can be included to simulate the papilla opening of a salivary duct.

As best illustrated in FIG. 3, the first end 90 advantageously defines a structure complimentary to the first proximal end 81 of channel 80 defined by the insert structure 14. The first end 90 is advantageously sized and configured to facilitate it to be releasably disposed within the proximal end 81 of the channel 80. This configuration facilitates the removal and replacement of duct structures 16 in the demonstration apparatus. In this embodiment, the first end 90 defines a bulbous shaped terminus that forms an opening 95. A rib extends around the outer circumference of the duct structure 16 near the first end 90 and is adapted to be received by a complimentary void formed by the insert structure 14. This mating structural relationship facilitates alignment between the corresponding opening 36 in the insert structure 14 and the opening 95 on the first end 90 of the duct structure 16. Furthermore, this interlocking structural interaction between the duct structure 16 and the insert structure 14 is considered advantageous at least because it helps to maintain relative positioning of these components during use of the demonstration apparatus 10 and to ensure a desired alignment between these components during setup of the demonstration apparatus 10 for use, such as during installation and/or switching of one duct apparatus 16 for another.

The insert structure can also define one or more cut-outs, recesses or other suitable structure that are complimentary in size, shape and configuration to a duct structure and that releasably receive and support a duct structure.

The duct structure 16 is also sized and configured to interact with the retaining members 82, 84, 86, 88 defined by the insert member 16. Advantageously, the duct structure 16 is sized and configured to enable the duct structure 16 to be alternatively engaged by and released from one or more of the retaining members 82, 84, 86, 88. For example, as best illustrated in FIG. 3, the duct structure 16 can be sized and configured such that the duct structure 16 can be passed through openings defined by ring-shaped retaining member 86, 88 during installation into and removal from the demonstration apparatus 10.

While any suitable number of duct structures can be included in a demonstration apparatus, it is considered advantageous to include a number of duct structures that is equivalent to the number of openings that defined by and pass through a thickness of the insert structure. For example, in the embodiment illustrated in FIGS. 1 through 3, the insert structure 14 defines first 34 and second 36 such openings. Accordingly, the demonstration apparatus 10 includes first 16 and second (not visible in the figures) duct structures.

It is noted that, if a second duct structure is included in a demonstration apparatus according to a particular embodiment, it can have the same structure as the first duct structure, or it can have a different structure than the first duct structure. Inclusion of duct structures having different structures can be advantageous for demonstration apparatuses intended to be used in training methods. For example, a first duct structure can have the structure illustrated in FIGS. 1, 10 and 11, which represents a substantially normal salivary duct. To facilitate comparison to normal structure, a second duct structure can be included that represents an abnormal salivary duct. FIGS. 12 through 17 illustrate various alternative duct structures useful in this regard.

Figure 12:
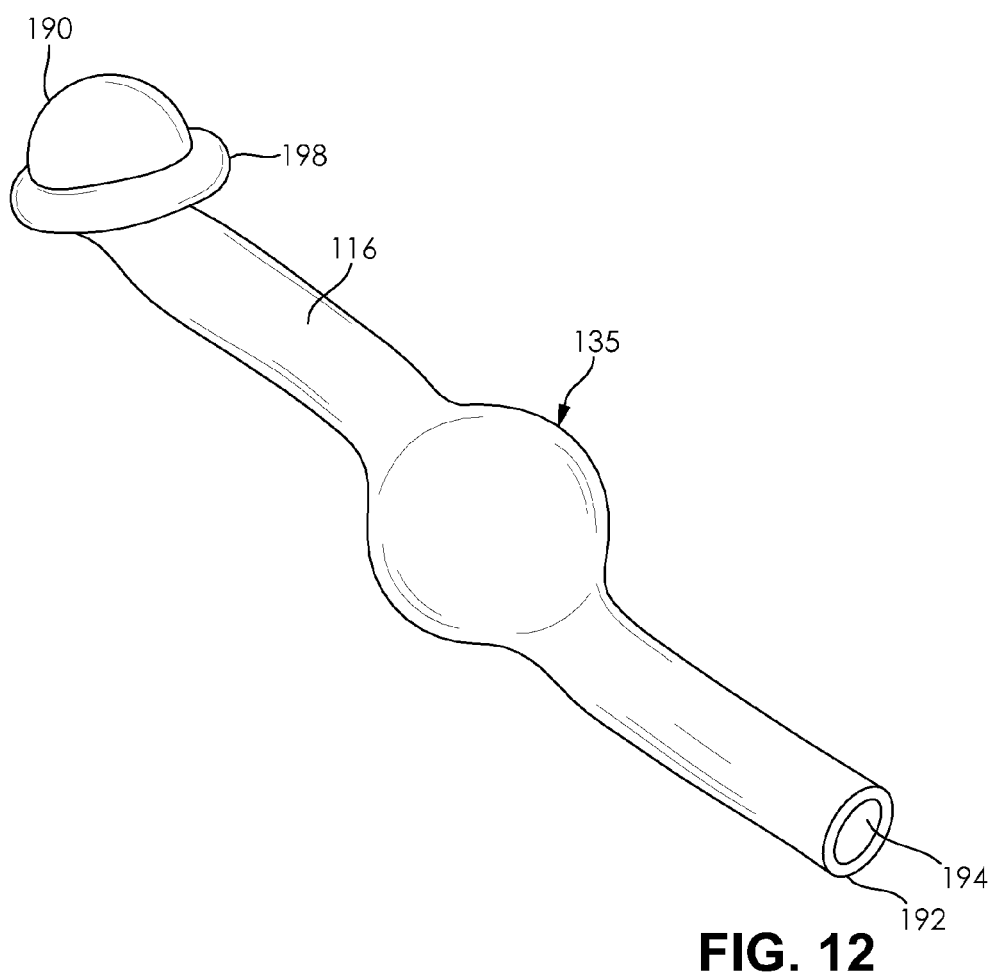
FIG. 12 is a perspective view of an alternative duct structure.
Figure 13:
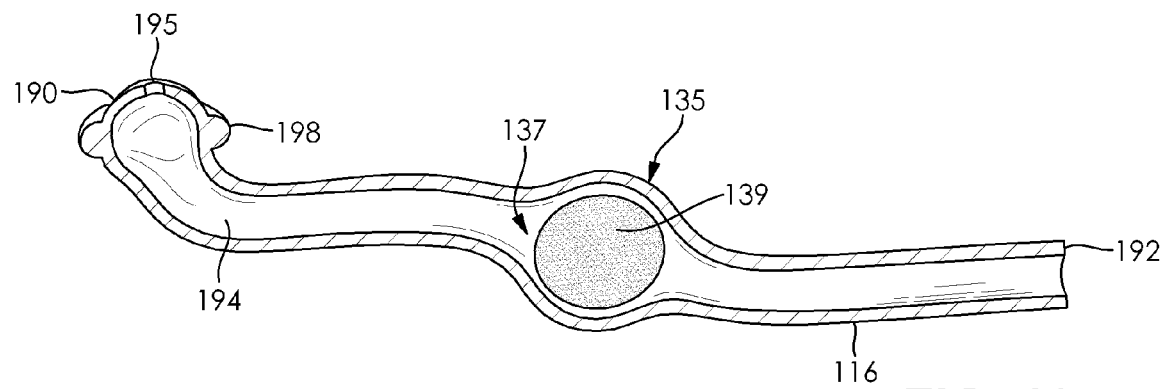
FIG. 13 is a sectional view of the duct structure illustrated in FIG. 12.

FIGS. 12 and 13 illustrate a first alternative duct structure 116. The duct structure 116 is similar to duct structure 16 illustrated in FIGS. 1, 10 and 11, except as detailed below. Thus, the duct structure 116 includes first 190 and second 192 ends and defines a lumen 194 extending from the first end 190 to the second end 192. The first end 190 defines a bulbous shaped terminus that forms an opening 195. A rib 198 extends around the outer circumference of the duct structure 116 near the first end 190 and is adapted to be received by a complimentary void formed by the insert structure of a demonstration apparatus with which the duct structure 116 is used.

In contrast to the duct structure 16 illustrated in FIGS. 1, 10 and 11, which has a substantially constant inner diameter along its length except for the rib 98 and the bulbous-shaped terminus formed on the first end 90, duct structure 116 defines a portion 135 along its length that has an enlarged inner diameter as compared to the remainder of the duct structure 116. As best illustrated in FIG. 13, the enlarged portion 135 also defines an interior chamber 137 having an inner diameter that is greater than the inner diameter of first and second portions of the lumen 194 that are immediately adjacent the enlarged portion 135 on either side. Also as best illustrated in FIG. 13, the enlarged portion 135 can be used to contain an object within the lumen 194 of the duct structure. Any suitable object can be disposed in the interior chamber 137 defined by the enlarged portion 135. For example, a simulated stone 139 can be disposed in the interior chamber 137. The simulated stone 139 can be disposed in the interior chamber 137 in any suitable manner, including direct placement via forced movement through the lumen 194 and/or placement through an opening, either temporary or permanent, in the duct structure 116 that provides access to the interior chamber 137. The simulated stone 139 is advantageously sized and configured to mimic the size, shape and/or configuration of stones formed in human salivary ducts via sialolithiasis. Inclusion of a duct structure 116 that includes such a simulated stone 139 facilitates use of a demonstration apparatus as a tool in demonstrating the use of medical devices useful in the destruction and/or removal of such stones, and the performance of methods for the destruction and/or removal of such stones. Also, as noted above, inclusion of a second duct structure with a structure that mimics the structure of a normal salivary duct—one that lacks a stone—further enhances the use of a demonstration apparatus in this manner.

If included, the simulated stone can comprise any suitable structure, configuration, size and formulation, and a skilled artisan will be able to select an appropriate structure, configuration, size and formulation based on various considerations, such as the desired hardness and relative ease with which the simulated stone can be broken using lithotripsy devices and techniques. The inventors have determined that a simulated stone comprising two parts gypsum cement and one part microbeads, such as glass microbeads. The inventor has determined that 35 micron diameter glass beads are suitable. This relative ratio provides a simulated stone that provides a desirable hardness reasonably mimics the ease with which naturally occurring salivary duct stones can be disrupted using conventional lithotripsy devices and techniques. This ratio can be varied if different properties are desired. For example, if it is desired to provide a simulated stone that can be disrupted more easily than naturally occurring salivary duct stones, the relative amount of the gypsum cement can be decreased and the relative amount of the microbeads can increased. Conversely, if it is desired to provide a simulated stone that is not disrupted as easily as naturally occurring salivary duct stones, the relative amount of the gypsum cement can be increased and the relative amount of the microbeads can decreased. While the simulated stones described herein are particularly well-suited for use with the demonstration apparatuses described herein, they are considered to have utility separate from the demonstration apparatuses. For example, the simulated stones can be used in other demonstration apparatuses not encompassed by the current disclosure.

Figure 14:
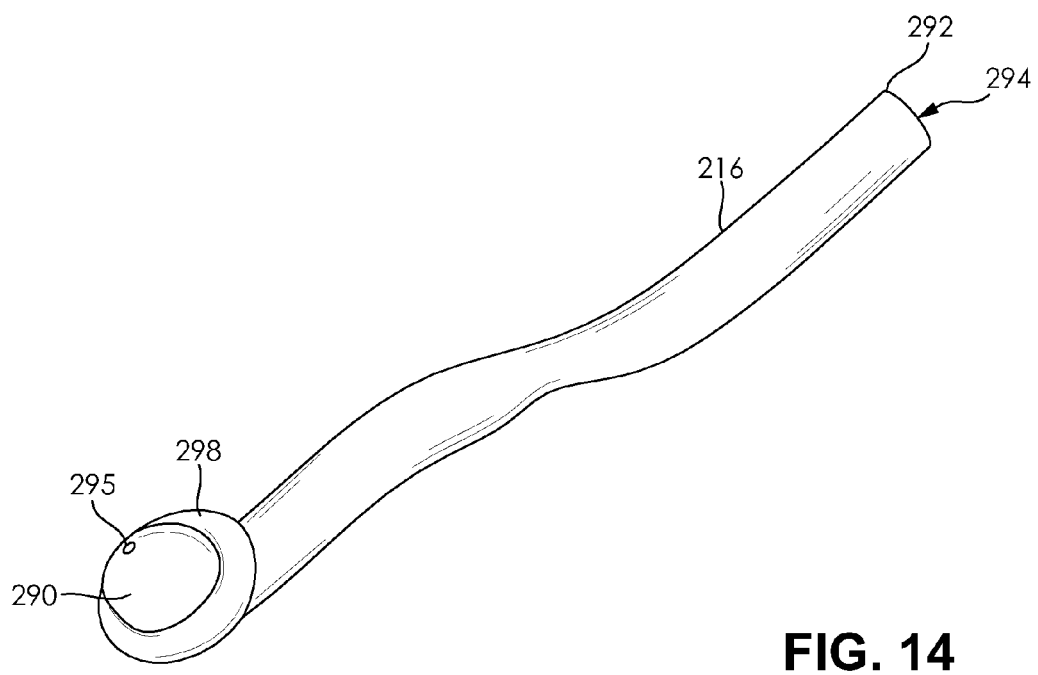
FIG. 14 is a perspective view of an alternative duct structure.
Figure 15:
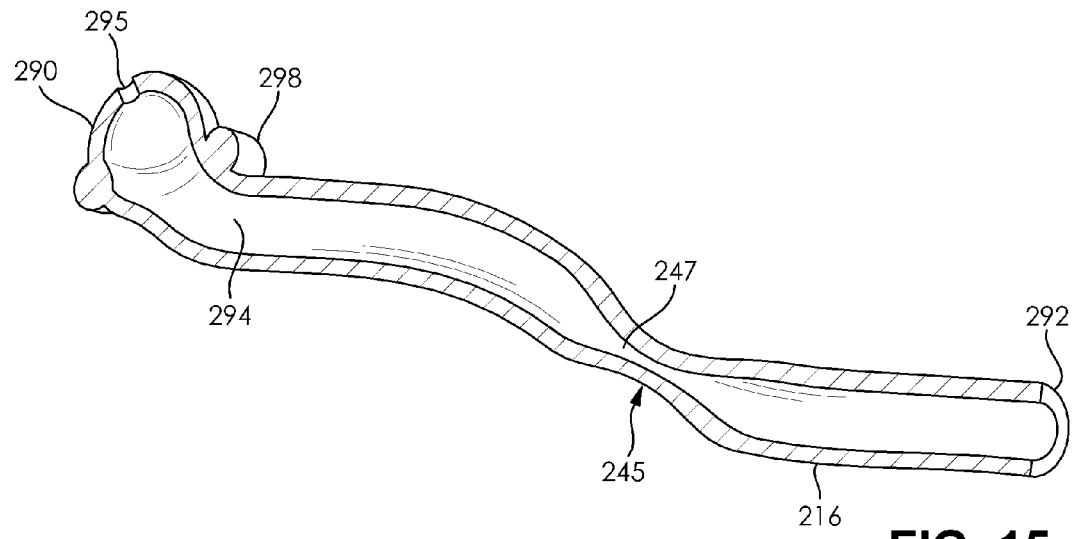
FIG. 15 is a sectional view of the duct structure illustrated in FIG. 14.

FIGS. 14 and 15 illustrate a second alternative duct structure 216. The duct structure 216 is similar to duct structure 16 illustrated in FIGS. 1, 10 and 11, except as detailed below. Thus, the duct structure 216 includes first 290 and second 292 ends and defines a lumen 294 extending from the first end 290 to the second end 292. The first end 290 defines a bulbous shaped terminus that forms an opening 295. A rib 298 extends around the outer circumference of the duct structure 216 near the first end 290 and is adapted to be received by a complimentary void formed by the insert structure of a demonstration apparatus with which the duct structure 216 is used.

In contrast to the duct structure 16 illustrated in FIGS. 1, 10 and 11, which has a substantially constant inner diameter along its length except for the rib 98 and the bulbous-shaped terminus formed on the first end 90, duct structure 216 defines a portion 245 along its length that has a reduced inner diameter as compared to the remainder of the duct structure 216. As best illustrated in FIG. 15, the reduced diameter portion 245 also defines an interior chamber 247 having an inner diameter that is less than the inner diameter of first and second portions of the lumen 294 that are immediately adjacent the reduced diameter portion 245 on either side. Inclusion of a duct structure 216 that includes a reduced diameter portion 245 facilitates use of a demonstration apparatus as a tool in demonstrating the use of medical devices within a salivary duct that contains a stricture, and the performance of methods within such salivary ducts. Also, as noted above, inclusion of a second duct structure with a structure that mimics the structure of a normal salivary duct—one that lacks a stricture— further enhances the use of a demonstration apparatus in this manner.

Figure 16:
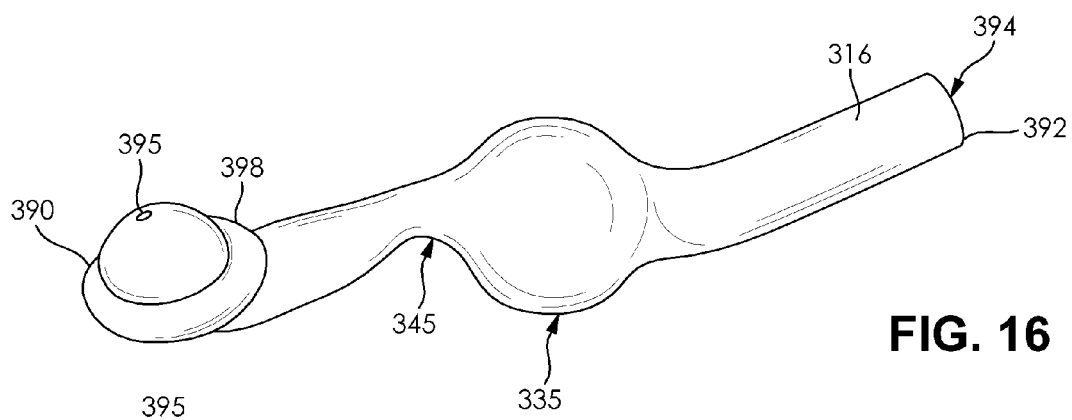
FIG. 16 is a perspective view of an alternative duct structure.
Figure 17:
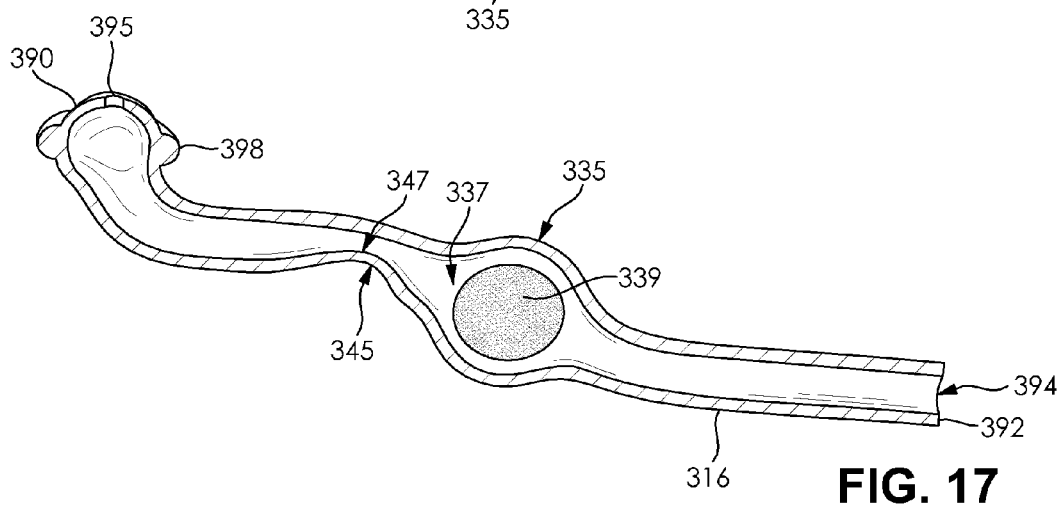
FIG. 17 is a sectional view of the duct structure illustrated in FIG. 16.

FIGS. 16 and 17 illustrate a third alternative duct structure 316. The duct structure 316 is similar to duct structure 16 illustrated in FIGS. 1, 10 and 11, except as detailed below. Thus, the duct structure 316 includes first 390 and second 392 ends and defines a lumen 394 extending from the first end 390 to the second end 392. The first end 390 defines a bulbous shaped terminus that forms an opening 395. A rib 398 extends around the outer circumference of the duct structure 316 near the first end 390 and is adapted to be received by a complimentary void formed by the insert structure of a demonstration apparatus with which the duct structure 316 is used.

Other alternative duct structures are contemplated as well. For example, a duct structure can include a tapered inner diameter along a portion of its length or along its entire length. Thus, the inner diameter of the duct structure can taper from a first, larger inner diameter to a second, smaller inner diameter. The first inner diameter can be positioned at either end of the duct structure, and the second inner diameter can be positioned at the other end of the duct structure. Furthermore, it is contemplated that a duct structure may also contain one or more branches that define branches in a main lumen. In these embodiments, branched duct structures can include one or more enlarged regions, stones, and/or strictures. Furthermore, as noted above, a demonstration apparatus according to a particular embodiment can include any suitable number and combination of various duct structures.

In contrast to the duct structure 16 illustrated in FIGS. 1, 10 and 11, which has a substantially constant inner diameter along its length except for the rib 98 and the bulbous-shaped terminus formed on the first end 90, duct structure 316 defines a portion 335 along its length that has an enlarged inner diameter as compared to the remainder of the duct structure 316. As best illustrated in FIG. 17, the enlarged portion 335 also defines an interior chamber 337 having an inner diameter that is greater than the inner diameter of portions of the lumen 394 that are immediately adjacent the enlarged portion 335 on either side. The enlarged portion 335 and interior chamber 337 are similar to the enlarged portion 135 and interior chamber 137 of the duct structure 116 illustrated in FIGS. 12 and 13. As such, and as best illustrated in FIG. 17, the enlarged portion 335 can be used to contain an object within the lumen 394 of the duct structure 316, such as a simulated stone 339. The duct structure 316 of this embodiment also includes a portion 345 along its length that has a reduced inner diameter as compared to the remainder of the duct structure 316. As best illustrated in FIG. 17, the reduced diameter portion 345 also defines an interior chamber 347 having an inner diameter that is less than the inner diameter portions of the lumen 394 that are immediately adjacent the reduced diameter portion 345 on either side. Inclusion of a duct structure 316 that includes an enlarged diameter portion 335 and a reduced diameter portion 345 facilitates use of a demonstration apparatus as a tool in demonstrating the use of medical devices within a salivary duct that contains a stricture and a stone, and the performance of methods within such salivary ducts. Also, as noted above, inclusion of a second duct structure with a structure that mimics the structure of a normal salivary duct— one that lacks a stricture and a stone—further enhances the use of a demonstration apparatus in this manner. Inclusion of a second duct structure with a structure that includes only one of an enlarged diameter portion containing a stone and a reduced diameter portion may also enhance the use of a demonstration apparatus in this manner by providing a structure having only a single non-normal structure for comparison purposes. Indeed, any suitable combination of duct structures can be included in a demonstration apparatus according to a particular embodiment.

The inclusion of duct structures that comprise separate members that are releasably received and engaged by complimentary structures of the insert structure 14 is considered advantageous at least because it facilitates the exchange of different types, sizes and/or configurations of duct structures and the placement of simulated stones. It is noted, however, that the insert structure can, as an alternative, integrally form one or more duct structures in a demonstration apparatus according to a particular embodiment.

Figure 19:
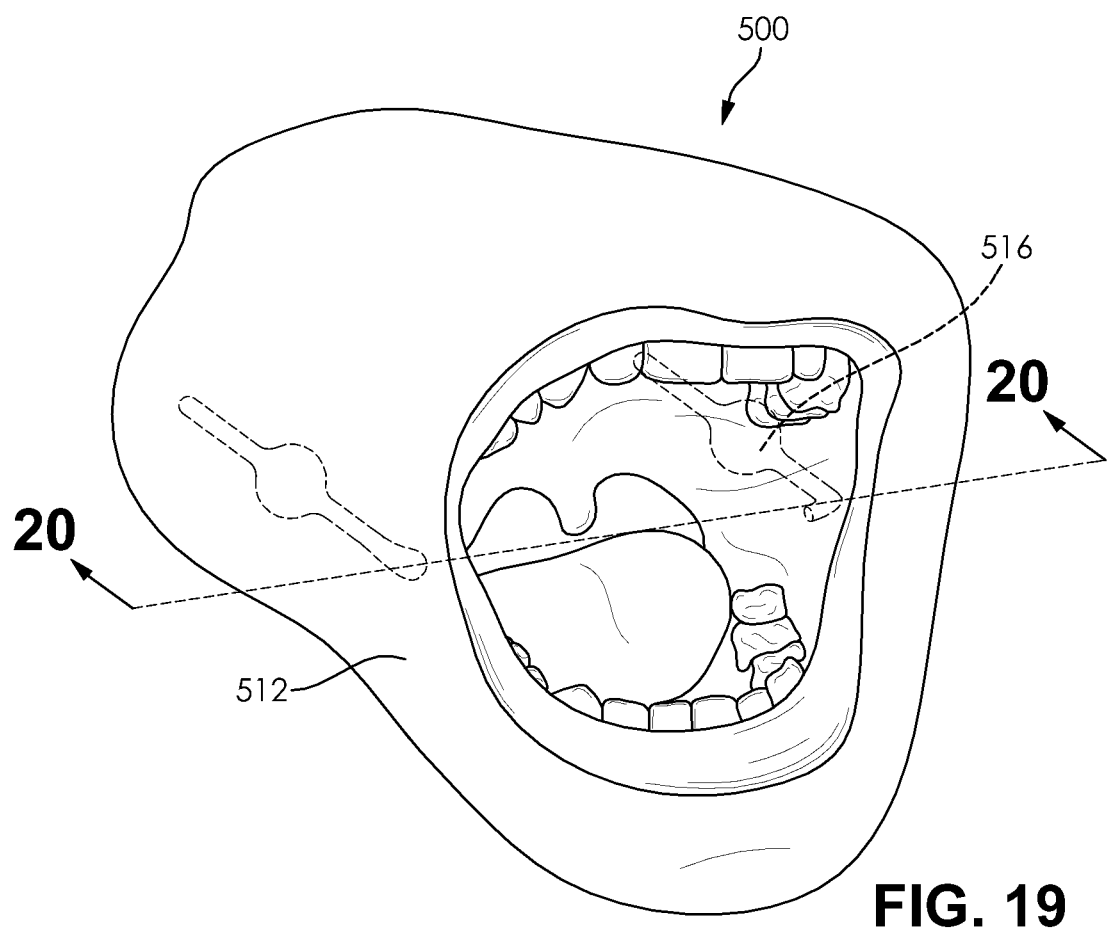
FIG. 19 illustrates another exemplary demonstration apparatus.
Figure 20:
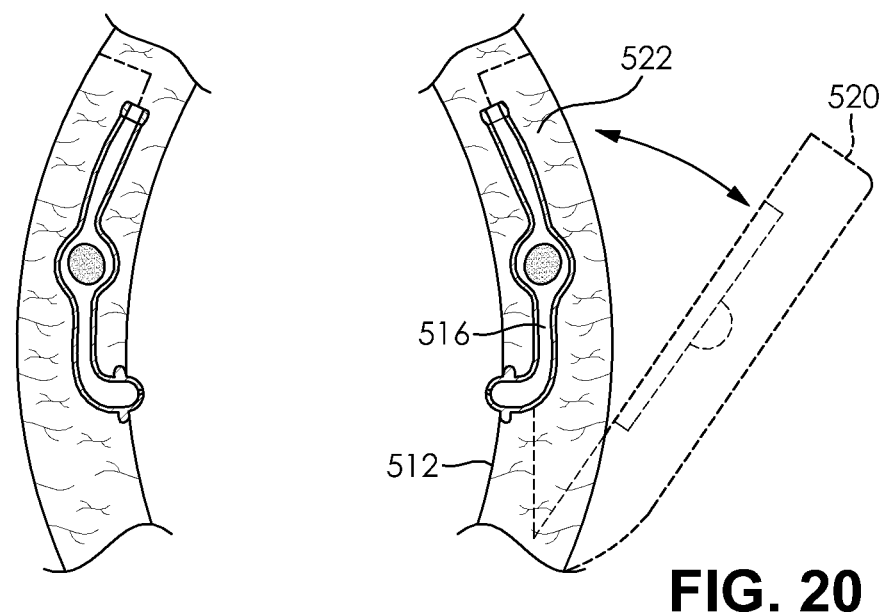
FIG. 20 is a sectional view of the demonstration apparatus illustrated in FIG. 19, taken along line 20-20.

FIGS. 19 and 20 illustrate another exemplary demonstration apparatus 500. The demonstration apparatus 500 is similar to the demonstration apparatus of the first embodiment, except as described below. Thus, the demonstration apparatus 500 includes a support structure 512 and a duct structure 516.

As best illustrated in FIG. 20, the support structure 512 in this embodiment defines first and second movable flaps 520 that can be moved away from the inner cavity defined by the support structure 512. When moved away in this manner, as illustrated by the phantom lines in FIG. 20, a tract 522 defined by the support structure 512 is revealed. The tract 522 is sized and configured to receive and retain a duct structure 516. This structural arrangement is considered advantageous at least because it facilitates removal and replacement of the duct structures 516.

As in the first exemplary embodiment, the support structure can integrally form the duct structures. In these embodiments, the support structure can be releasably attached to a rigid structure, such as a structure that mimics the bony structures of the jaw.

Any suitable number, size, configuration and orientation of movable flaps can be included an a demonstration apparatus according to this embodiment. Furthermore, the inclusion of an insert 514, such as an insert defining a tongue-like projection and/or one or more rows of teeth-like structures, is considered advantageous but optional. Also, if included, the insert can comprise a separate component that can be positioned within the support structure 512 or can be formed integrally with the support structure 512.

Figure 21:
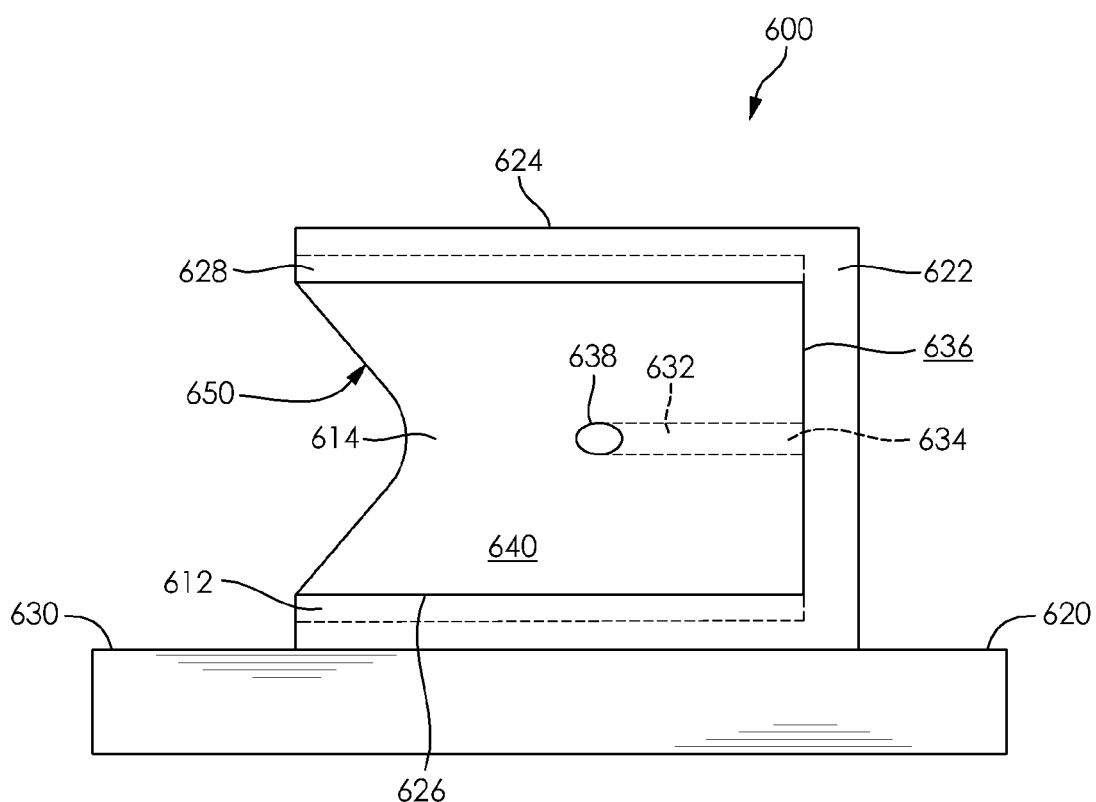
FIG. 21 illustrates another exemplary demonstration apparatus.

FIG. 21 illustrates another exemplary demonstration apparatus 600. The demonstration apparatus 600 according to this embodiment is structured to provide a training environment that isolates a particular tissue, such as a cheek, from other components of the surrounding environment, such as the mouth. Thus, the demonstration apparatus 600 of this embodiment lacks any structure that corresponds to a tongue, teeth and other oral cavity structures. It is noted, though, that suitable structures that mimic these elements can be included in a demonstration apparatus according to a particular embodiment.

The demonstration apparatus 600 includes a base 612 and a flexible panel 614 that is releasably connected to the base 612, such as by the structure described below.

The base 612 defines a platform 620, an upright 622 extending from the base 612, and first 624 and second 626 opposing arms that extend substantially parallel to the base 612 from the upright 622. The first arm 624 defines a first channel 628 and the second arm 626 defines a second channel 630. Each channel 628, 630 is sized and configured to releasably receive a corresponding structure, such as a projection, defined by the flexible panel 614.

The flexible panel 614 is a flat or substantially flat section of material that defines corresponding structure, such as projections, to allow the flexible panel 614 to be connected to the base 612 in a manner that allows the flexible panel 614 to be released from the base 612, such as by application of a pulling force. The flexible panel 614 defines a passageway 632 that extends from an opening 634 on an end surface 636 of the flexible panel 614, through the material of the flexible panel 614 to another opening 638 on a side surface 640 of the flexible panel 614.

As illustrated in the figure, the flexible panel 614 can be sized and configured such that it defines a notch 650. The inclusion of the notch 650 is considered advantageous at least because the structure provided by the notch mimics the position of upper and lower lips of an open mouth, which is expected to provide a demonstration and/or training experience that more closely resembles interaction with an actual animal.

In all embodiments, the all components of the demonstration apparatus can be formed of any suitable material, including presently known and later-developed materials considered suitable for use in models. A skilled artisan will be able to select appropriate material or materials for each component in a demonstration apparatus according to a particular embodiment based on various considerations, including the nature of any devices that are intended to be used with the demonstration apparatus during its use (e.g., catheters, stone removal devices, etc.). Examples of suitable materials include, but are not limited to, plaster and polymeric materials, such as polycarbonates, nylons, silicone-based materials, elastomeric materials, and any other polymeric material suitable for use in apparatuses.

While any suitable materials can be used for each component, the inventors have determined that it is advantageous to form the support structure with a material that is a relatively hard material as compared to the insert structure, and to form the insert structure from a relatively soft material as compared to the support structure. This relative hardness of these components mimics the relative hardness between the jaw bone and soft tissue of the oral cavity in a human and, therefore, allows the demonstration apparatus to more accurately simulate the conditions a user would encounter during a procedure on a human. In these embodiments, suitable materials include a polycarbonate material for the support structure and an elastomeric material for the insert structure.

The demonstration apparatus and components is particularly well-suited to be provided as a kit useful in the demonstration of medical devices and/or methods on a variety of salivary duct structures that occur in a population. For example, a kit can include a support structure according to any desired embodiment, an insert structure according to any desired embodiment, and one or more duct structures according to any desired embodiment. If a kit includes more than one duct structure, the duct structures can have the same or different overall structures.

Figure 18:
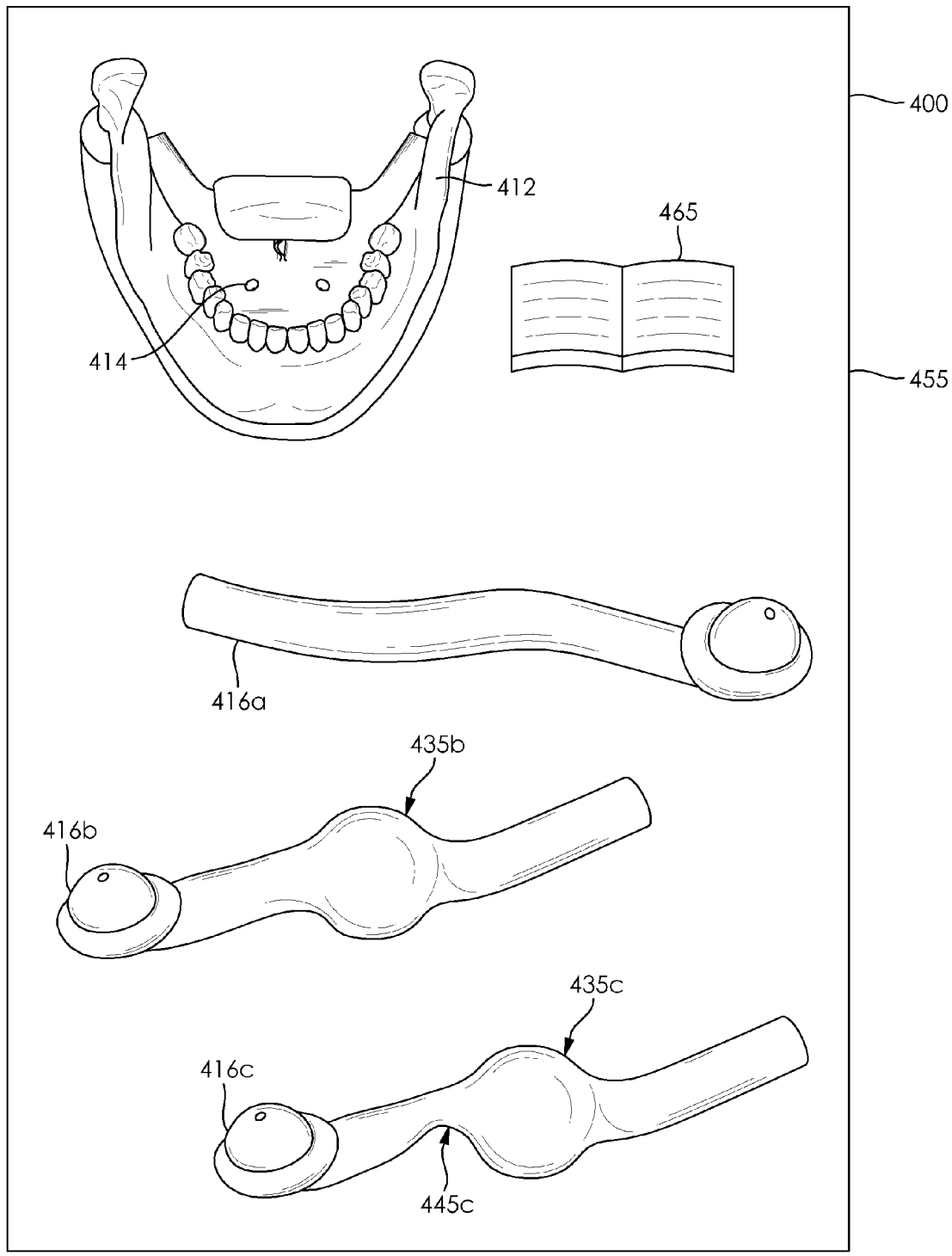
FIG. 18 is a schematic illustration of a kit.

FIG. 18 is a schematic illustration of an exemplary kit 400. The kit 400 includes a support structure 412, an insert structure 414, and three duct structures 416a, 416b, and 416c. All components can be included in a container 455, and the kit 400 can further include documentation, such as instructions for use 465, labeling, and any other desired components. As illustrated in FIG. 18, it is considered advantageous to include multiple duct structures in a kit 400. Any suitable number of duct structures can be included in a kit, and a skilled artisan will be able to determine an appropriate number for a kit according to a particular embodiment based on various considerations, including the number of different duct anatomies for which the demonstration apparatus is intended to be used. Furthermore, if more than one duct structure is included, any suitable combination of alternative duct structures can be used in a kit according to a particular embodiment. A skilled artisan will be able to select an appropriate combination of alternative duct structures based on various considerations, including the specific duct anatomies for which the demonstration apparatus is intended to be used. It is considered advantageous to provide at least one duct structure that represents a normal salivary duct, as described above, and at least one duct structure that represents a non-normal salivary duct, as described above. For example, as illustrated in FIG. 18, a kit 400 can include a first duct structure 416a that has a substantially constant inner diameter along its length except for the structure at the end that is adapted for interaction with mating structure on the insert structure 414 of the kit 400, and a second duct structure 416b that defines an enlarged portion 435b. A simulated stone (not illustrated in FIG. 18) can also be included in the kit 400 and can be, but need not be, positioned in the interior chamber defined by the enlarged portion prior to use of the kit 400. Any suitable number and type of additional duct structures can also be included, including a third duct structure 416c that defines an enlarged portion 435c and a stricture 445c. An additional simulated stone (not illustrated in FIG. 18) can also be included in the kit 400 for this duct structure 416b. If included, this simulated stone can also be, but need not be, positioned in the interior chamber defined by an enlarged portion of an appropriate duct structure prior to use of the kit 400. Each of the duct structures included in the kit are sized and configured to be releasably received by retaining members defined by the insert member, as described.

The inventors have determined that a particularly useful kit for demonstrating the use of sialendoscopy medical devices and methods is a kit that includes a support structure; an insert structure; and one each of a duct structure that represents a normal salivary duct, as described above; a duct structure that represents a non-normal salivary duct and includes an enlarged portion defining an interior chamber and including a simulated stone, as described above; a duct structure that represents a non-normal salivary duct and includes a reduced diameter portion that defines a stricture, as described above; and a duct structure that represents a non-normal salivary duct and includes an enlarged portion defining an interior chamber and including a simulated stone and a reduced diameter portion that defines a stricture.

An exemplary method of use comprises using a demonstration apparatus according to an apparatus to perform a sialendoscopy method.

The foregoing detailed description refers to exemplary occlusion devices and includes the best mode for practicing the invention. The description and the appended drawings illustrating the described devices are intended only to provide examples and not to limit the scope of the claims in any manner.

What is claimed is:

1. A demonstration apparatus, comprising:
a support structure;
an insert structure contacting the support structure, the insert structure having a first surface defining a first opening and a second surface defining a second opening, the insert structure defining a channel having a first end in communication with the first opening and a second end in communication with the second opening; and
a duct structure contacting the insert structure, the duct structure comprising an elongate tubular member having a first end in fluid communication with the first opening, a second end, and defining a lumen extending from the first end to the second end;
wherein a portion of the duct structure is releasably disposed within the channel.

2. The demonstration apparatus of claim 1, wherein the support structure is formed of a relatively hard material and the insert structure is formed of a relatively soft material.

3. The demonstration apparatus of claim 1, wherein the support structure is a replica of a human lower jaw bone.

4. The demonstration apparatus of claim 1, wherein the support structure defines a chamber and the insert structure is disposed within the chamber.

5. The demonstration apparatus of claim 1, wherein the support structure includes an inner surface and the inner surface defines an inwardly-projecting ridge.

6. The demonstration apparatus of claim 1, wherein the support structure includes a proximal end, a distal end, a first lateral side and a second lateral side, and further comprises a bridge extending from the proximal end toward the distal end.

7. The demonstration apparatus of claim 6, wherein the support structure includes an inner surface and the inner surface defines an inwardly-projecting ridge.

8. The demonstration apparatus of claim 7, wherein the bridge includes a base portion that cooperatively defines a channel with the inwardly-projecting ridge; and
wherein the channel is adapted to releasably receive a portion of the insert structure.

9. The demonstration apparatus of claim 1, wherein the first surface of the insert structure defines a third opening and the second surface of the insert structure defines a fourth opening; and
wherein the insert structure defines a second channel having a third end in communication with the third opening and a fourth end in communication with the fourth opening;
wherein said demonstration apparatus further comprises a second duct structure having a portion releasably disposed within the second channel.

10. The demonstration apparatus of claim 1, wherein the insert structure defines one or more retaining members adapted to releasably receive a portion of the duct structure.

11. The demonstration apparatus of claim 1, wherein the insert structure includes a movable portion extending from a portion of the top surface.

12. The demonstration apparatus of claim 11, wherein the movable portion is a replica of a human tongue.

13. The demonstration apparatus of claim 1, wherein the first and second ends of the duct structure define open ends.

14. The demonstration apparatus of claim 13, further comprising a plug adapted to be releasably disposed within the second end of the duct structure and to substantially block fluid flow through the second end and out of the lumen.

15. The demonstration apparatus of claim 1, wherein the second end of the duct structure defines a closed end.

16. The demonstration apparatus of claim 1, wherein the first end of the duct structure defines an enlarged portion.

17. The demonstration apparatus of claim 1, wherein the duct structure defines an enlarged portion.

18. The demonstration apparatus of claim 17, further comprising a simulated stone disposed within the enlarged portion.

19. A demonstration apparatus, comprising:
a support structure;
an insert structure contacting the support structure, the insert structure having a first surface defining a first opening and a second surface defining a second opening, the insert structure defining a channel having a first end in communication with the first opening and a second end in communication with the second opening; and
first and second duct structures contacting the insert structure, the structure comprising an elongate tubular member having a first end in fluid communication with the first opening, a second end, and defining a lumen extending from the first end to the second end;
wherein the support structure is formed of a relatively hard material and the insert structure is formed of a relatively soft material
wherein a portion of the first duct structure is releasably disposed within the channel;
wherein the first surface of the insert structure defines a third opening and the second surface of the insert structure defines a fourth opening; and
wherein the insert structure defines a second channel having a third end in communication with the third opening and a fourth end in communication with the fourth opening; and
wherein said demonstration apparatus further comprises a second duct structure having a portion releasably disposed within the second channel.

20. A kit, comprising:
a demonstration apparatus, comprising:
a support structure;
an insert structure contacting the support structure, the insert structure having a first surface defining a first opening and a second surface defining a second opening, the insert structure defining a channel having a first end in communication with the first opening and a second end in communication with the second opening; and
at least one duct structure comprising an elongate tubular member having a first end, a second end, and defining a lumen extending from the first end to the second end, the at least one duct structure adapted to contact the insert structure such that the first end is in fluid communication with the first opening and a portion of the duct structure is releasably disposed within the channel.

* * * * *

UNITED STATES PATENT AND TRADEMARK OFFICE
CERTIFICATE OF CORRECTION

| | |
|---|---|
| PATENT NO. | : 9,022,789 B2 |
| APPLICATION NO. | : 13/606730 |
| DATED | : May 5, 2015 |
| INVENTOR(S) | : Schaeffer et al. |

It is certified that error appears in the above-identified patent and that said Letters Patent is hereby corrected as shown below:

In the Claims

Claim 19, line 23, reads --the structure comprising--.

Claim 19, line 23, should read --the first duct structure comprising--.

Signed and Sealed this
Twenty-second Day of September, 2015

Michelle K. Lee
*Director of the United States Patent and Trademark Office*